UNITED STATES PATENT OFFICE 2,580,867

DISAZO DYESTUFFS AND THEIR CHROMIUM, IRON AND COBALT COMPLEXES

Walter Wehrli and Willy Steinemann, Basel, Switzerland, assignors to Sandoz A. G., Basel, Switzerland, a Swiss firm No Drawing. Application March 20, 1950, Serial No. 150,797. In Switzerland April 14, 1949

6 Claims. (Cl. 260—148)

The present invention relates to new disazo dyestuffs and their chromium, iron and cobalt complexes which are particularly suitable for dyeing leather, and to the production thereof.

According to the present invention, it has been found that valuable disazo dyestuffs can be obtained by starting from 1 mol of an o-aminophenol or of an o-aminonaphthol, 1 mol of a 1-amino - 8 - hydroxynaphthalene - sulphonic acid and 1 mol of a naphthol capable of coupling and which may also be sulphonated, and building up in this way disazo dyestuffs of the formula

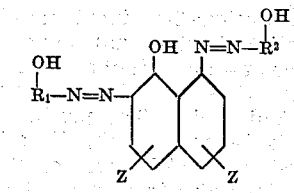

wherein

denotes the residue of an o-hydroxy diazo compound of the benzene or naphthalene series which may if desired also be further substituted, and

denotes the residue of a naphthol which may be sulphonated and which is capable of coupling in the o-position to the OH group, and in which $R_1$ and $R_2$ together must contain at least one sulphonic acid group, and one Z denotes a sulphonic acid group and the other Z denotes a sulphonic acid group or a hydrogen atom.

For the purpose of converting these new dyestuffs into compounds containing chromium, iron or cobalt bound in a complex form, the disazo dyestuffs so obtained, or the monoazo dyestuffs intermediately obtained during their preparation, are treated with reagents capable of yielding chromium, iron and cobalt respectively.

As reagents capable of yielding chromium, iron and cobalt, respectively use may be made of: potassium chrome alum, ammonium chrome alum, sodium chrome alum, chromium chloride, chromium sulphate, chromium acetate, chromium formiate, cobalt acetate, cobalt formiate, cobalt chloride, cobalt sulphate, iron sulphate, iron chloride.

As starting materials, there may be employed as o-aminophenol or o-aminonaphthol for instance the following substances: 4-nitro-2-aminophenol, 5-nitro-2-aminophenol, 4-chloro-2-aminophenol, 6-nitro-4-chloro-2-aminophenol, 6-nitro-2-aminophenol-4-sulphonic acid, 4-nitro-2-aminophenol-6-sulphonic acid, 1-amino-2-hydroxynaphthalene-4-sulphonic acid, 1-amino-2-hydroxy-6-nitronaphthalene - 4 - sulphonic acid, and 2-aminophenol-4,6-disulphonic acid; as 1-amino - 8 - hydroxynaphthalene - sulphonic acids there may for example be used: 1-amino-8-hydroxynaphthalene-3,6-disulphonic acid, 1-amino-8-hydroxynaphthalene-4-sulphonic acid, and 1-amino - 8 - hydroxynaphthalene-4,6-disulphonic acid; and as naphthols capable of coupling and which may be sulphonated, there may for example be utilized: beta-naphthol, 2-hydroxynaphthalene-6-sulphonic acid, 2-hydroxynaphthalene-4-sulphonic acid, 1-hydroxynaphthalene-4-sulphonic acid, 1-hydroxynaphthalene-3-sulphonic acid, 1-hydroxynaphthalene-5-sulphonic acid, 1-hydroxynaphthalene-3,6-disulphonic acid, 1-hydroxynaphthalene-3,8-disulphonic acid, 1-hydroxynaphthalene-4,8-disulphonic acid, 2-hydroxynaphthalene-3,6-disulphonic acid, and 1,8-dihydroxynaphthalene-3,6-disulphonic acid.

It will be understood that in the examples the specifically mentioned metal yielding agent may be replaced by any one of the aforementioned agents to yield the corresponding metal complex.

The new dyestuffs are very soluble in water and dye leather in excellent gray shades which are fast to light.

The following examples illustrate the invention without limiting it in any way. The parts denote parts by weight. The temperatures are in degrees centigrade.

*Example 1*

23.4 parts of 4-nitro-2-aminophenol-6-sulphonic acid are diazotized in the usual way and coupled in an ice cold solution made strongly alkaline with sodium carbonate with 31.9 parts of 1-amino-8-hydroxynaphthalene - 3,6 - disulphonic acid. After coupling is finished the aminoazo dyestuff is salted out, filtered off and again dissolved in water. For further diazotization this solution is treated with 6.9 parts of sodium nitrate and slowly run into a mixture of dilute hydrochloric acid and ice. Finally it is coupled in a solution made alkaline with sodium carbonate with 22.4 parts of 2-hydroxynaphthalene-6-sulphonic acid.

The same dyestuff can be obtained if 47.3 parts of 1 - amino-8-(0-p-toluenesulphonyl)-naphthalene-3,6-disulphonic acid are diazotized with sodium nitrite coupled with 22.4 parts of 2-hydroxynaphthalene-6-sulphonic acid and then the monoazo dyestuff which is formed is saponified with an alkaline reagent and finally coupled with the diazo compound from 23.4 parts of 4-nitro-2-aminophenol-6-sulphonic acid.

For conversion into the cobalt complex, the disazo dyestuff is warmed for several hours at 90-95° with an aqueous solution containing 30 parts of cobalt sulphate in the presence of sodium acetate. Thereupon the metal-containing dyestuff is separated in known manner. It dyes leather in gray shades of excellent fastness to light.

Example 2

23.4 parts of 6-nitro-2-aminophenol-4-sulphonic acid are diazotized with 6.9 parts of sodium nitrite and coupled in the presence of an excess of sodium carbonate with 31.9 parts of 1-amino-8-hydroxynaphthalene-3.6-disulphonic acid. The aminoazo dyestuff is isolated by salting out and filtering off, and is thereupon dissolved again, and after the addition of 6.9 parts of sodium nitrite, is further diazotized by pouring into a mixture of dilute hydrochloric acid and ice. It is finally coupled with 14.4 parts of β-naphthol in alkaline solution.

The disazo dyestuff thus obtained and which corresponds to the formula:

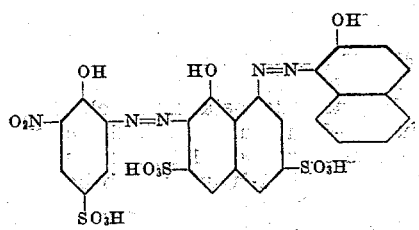

is converted into its metal complex by warming for several hours at 90-95° in a solution containing sodium acetate and 30 parts of cobalt sulphate. The isolated dyestuff which contains cobalt in complex form dyes leather in gray shades of excellent fastness to light.

Example 3

23.4 parts of 4-nitro-2-aminophenol-6-sulphonic acid are diazotized in the usual way and coupled with 31.9 parts of 1-amino-8-hydroxynaphthalene-4.6-disulphonic acid in the presence of an excess of sodium carbonate. The aminoazo dyestuff is isolated and is then further diazotized and finally coupled with 22.4 parts of 2-hydroxynaphthalene-6-sulphonic acid.

The disazo dyestuff thus obtained is converted into its cobalt complex by warming for several hours at 90-95° with a solution containing sodium acetate and 30 parts of cobalt sulphate. The dyestuff containing cobalt dyes leather in beautiful gray shades of outstanding fastness to light.

Example 4

18.9 parts of 2-aminophenol-4-sulphonic acid are diazotized with dilute sulphuric acid and 6.9 parts of sodium nitrite and coupled with 31.9 parts of 1-amino-8-hydroxynaphthalene-3.6-disulphonic acid in an ice cold solution made strongly alkaline with sodium carbonate. When the coupling is finished, the aminoazo dyestuff which is formed is isolated and is dissolved in water and then coupled by adding 6.9 parts of sodium nitrite and allowing the mixture to run slowly into a mixture of dilute sulphuric acid and ice. It is then coupled with 22.4 parts of 2-hydroxynaphthalene-6-sulphonic acid in the presence of sodium carbonate. The disazo dyestuff is isolated in the usual manner and is warmed for several hours at 90-95° in an aqueous solution of 30 parts of cobalt sulphate containing sodium acetate in the solution. The dyestuff contains cobalt bound in complex form and dyes leather in gray shades of excellent fastness to light.

Example 5

15.4 parts of 4-nitro-2-aminophenol are diazotized in the usual way and coupled with 31.9 parts of 1-amino-8-hydroxynaphthalene-3.6-disulphonic acid in a solution containing an excess of sodium carbonate. The monoazo dyestuff is salted out, filtered off and again dissolved in water and is then treated with 6.9 parts of sodium nitrite and poured slowly into ice cold dilute hydrochloric acid. When the diazotization is complete it is coupled with a solution of 2-hydroxynaphthalene-6-sulphonic acid made alkaline with sodium carbonate. The product is converted into its cobalt complex by warming for several hours at 90-95° with an aqueous solution containing sodium acetate and 30 parts of cobalt sulphate. The cobalt complex of the disazo dyestuff dyes leather in very good gray shades of very good fastness to light.

Example 6

23.4 parts of 6-nitro-2-aminophenol-4-sulfonic acid are diazotized in the usual way and coupled in the presence of an excess of sodium carbonate with 31.9 parts of 1-amino-8-hydroxy-naphthalene-3.6-disulfonic acid. The produced aminoazo dyestuff is isolated, again diazotized, and finally coupled with 14.5 parts of 2-hydroxynaphthalene. In order to convert the thus-obtained disazo dyestuff into the iron complex, it is heated for several hours to 90-100° in an aqueous sodium acetate solution containing 30 parts of ferrous sulfate. The iron-containing dyestuff thus produced dyes leather in brownish-gray shades of very good fastness to light.

Example 7

The aminoazo dyestuff, obtained by the soda-alkaline coupling of 23.4 parts of diazotized 4-nitro-2-aminophenol-6-sulfonic acid and 31.9 parts of 1-amino-8-hydroxynaphthalene-3.6-disulfonic acid, is again diazotized and thereupon coupled with 22.4 parts of Schäffer's salt. The resultant disazo dyestuff corresponds to the formula:

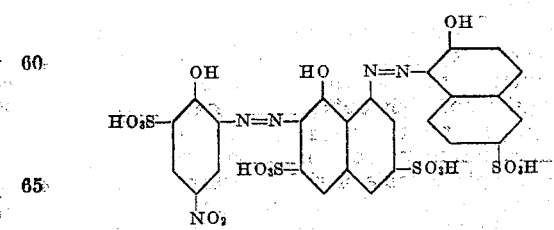

In order to convert it into the chromium complex, it is boiled for several hours under a reflux condenser in 1000 parts of water with 40 parts of chromium fluoride in the presence of sodium acetate, and the formed complex is then isolated. The thus-obtained chromium-containing dyestuff dyes leather in beautiful neutral gray shades of excellent fastness to light.

Example 8

The disazo dyestuff described in Example 3, obtained from 23.4 parts of 4-nitro-2-aminophenol-6-sulfonic acid, 31.9 parts of 1-amino-8-hydroxynaphthalene-4.6-disulfonic acid and 22.4 parts of 2-hydroxynaphthalene-6-sulfonic acid is boiled under a reflux condenser for several hours in an aqueous solution of sodium acetate containing 30 parts of chromium fluoride, in order to convert the dyestuff to the chromium complex. The obtained and isolated chromium-containing dyestuff dyes leather in gray shades of very good fastness to light.

Example 9

The disazo dyestuff obtained according to Example 1 from 23.4 parts of 4-nitro-2-aminophenol-6-sulfonic acid, 31.9 parts of 1-amino-8-hydroxynaphthalene-3.6-disulfonic acid and 22.4 parts of 2-hydroxynaphthalene-6-sulfonic acid is boiled under a reflux condenser for several hours in an aqueous sodium acetate solution containing 30 parts of ferrous sulfate. The isolated resultant dyestuff, containing iron bound in complex form, dyes leather in brownish gray shades of outstanding fastness to light.

Example 10

23.4 parts of 4-nitro-2-aminophenol-6-sulfonic acid are diazotized in the usual way and coupled in soda-alkaline medium with 23.9 parts of 1-amino-8-hydroxynaphthalene-4 - sulfonic acid. The isolated aminoazo dyestuff product is then again diazotized and finally coupled with 22.4 parts of 2-hydroxynaphthalene-6-sulfonic acid. By heating for several hours to 90–100° with a solution containing sodium acetate and 30 parts of ferrous sulfate, the thus-obtained disazo dyestuff is converted into its iron complex. The iron-containing dyestuff dyes leather in grayish-brown shades of good light-fastness.

Example 11

The disazo dyestuff obtained according to Example 10 from 23.4 parts of 4-nitro-2-aminophenol-6-sulfonic acid, 23.9 parts of 1-amino-8-hydroxynaphthalene-4-sulfonic acid and 22.4 parts of 2-hydroxynaphthalene-6-sulfonic acid, is boiled for several hours under a reflux condenser in 1000 parts of water with 40 parts of chromium fluoride in the presence of sodium acetate. The isolated dyestuff, containing chromium bound in complex form, dyes leather in gray shades of very good fastness to light.

Other valuable disazo dyestuffs and their chromium, iron and cobalt complexes can be obtained according to the present invention for example from corresponding amounts of the following components, while otherwise proceeding according to the preceding examples:

| | o-Aminophenol of o-Aminonaphthol | 1-amino-8-hydroxy-naphthalene-sulphonic acids | Naphthols capable of coupling | Metal complex | Shade of the dyeing of the metal complex on leather |
|---|---|---|---|---|---|
| 1 | 4-nitro-2-aminophenol-6-sulphonic acid. | 1-amino-8-hydroxy-naphthalene-3.6-disulphonic acid. | 1-hydroxy-naphalene-4-sulphonic acid. | Cobalt | Gray. |
| 2 | do | do | 2-hydroxy-naphthalene-4-sulphonic acid. | do | Do. |
| 3 | 4-chlor-2-aminophenol-6-sulphonic acid. | do | 2-hydroxy-naphthalene-6-sulphonic acid. | do | Do. |
| 4 | 1-amino-2-hydroxynaphthalene-4-sulphonic acid. | do | do | do | Brownish-gray. |
| 5 | 4-chlor-6-nitro-2-aminophenol. | do | do | do | Do. |
| 6 | 4-nitro-2-aminophenol. | do | 1.8-dihydroxy-naphthalene-3.6-disulphonic acid. | do | Reddish-gray. |
| 7 | 4-nitro-2-aminophenol-6-sulphonic acid. | 1-amino-8-hydroxy-naphthalene-4-sulphonic acid. | 2-hydroxy-naphthalene-6-sulphonic acid. | do | Gray. |
| 8 | 1-amino-2-hydroxy-naphthalene-4-sulphonic acid. | 1-amino-8-hydroxy-naphthalene-4.6-disulpnic acid. | do | do | Do. |
| 9 | do | do | 1-hydroxy-naphthalene-4-sulphonic acid. | do | Do. |
| 10 | 6-nitro-2-aminophenol-4-sulphonic acid. | do | 3-naphthol. | do | Do. |

The metal-free disazo dyestuff corresponding to item 1 of the foregoing table corresponds to the formula:

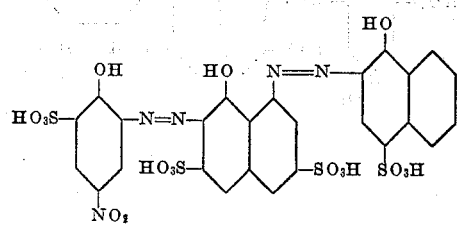

Having thus disclosed our invention what we claim is:

1. A metal complex compound selected from the group consisting of the chromium, iron and cobalt complex compounds of the disazo dyestuffs corresponding to the formula

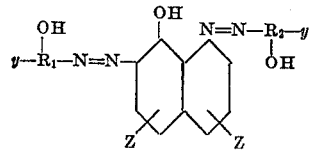

wherein $R_1$ stands for aryl radical selected from the group consisting of radicals of the benzene and naphthalene series, the OH attached to $R_1$ being in ortho-position to the adjacent azo bridge, wherein $R_2$ stands for a radical of the naphthalene series, the OH attached to $R_2$ being in ortho-position to the adjacent azo bridge, wherein one $y$ and one Z each stand for a sulfonic acid group, the other $y$ and Z being each a member chosen from the group consisting of hydrogen and the sulfonic acid group.

2. The cobalt complex compound of the disazo dyestuff of the formula

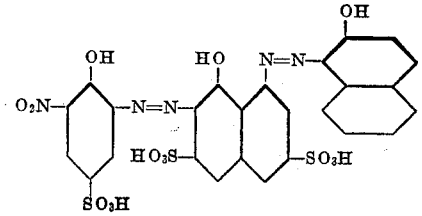

3. The cobalt complex compound of the disazo dyestuff of the formula:

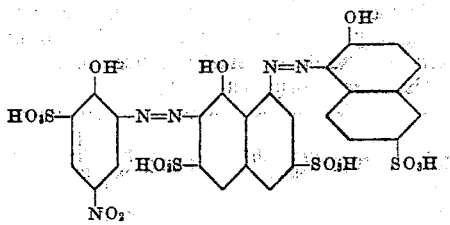

4. The cobalt complex compound of the disazo dyestuff of the formula

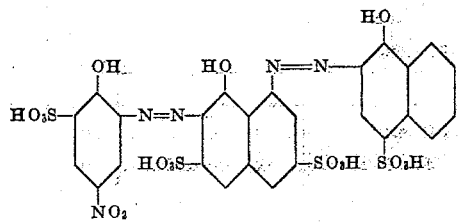

5. The chromium complex compound of the disazo dyestuff of the formula

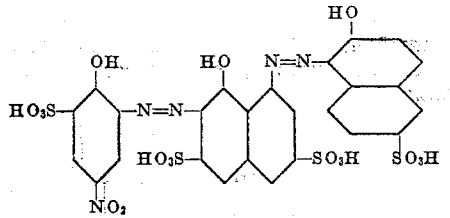

6. The iron complex compound of the disazo dyestuff of the formula

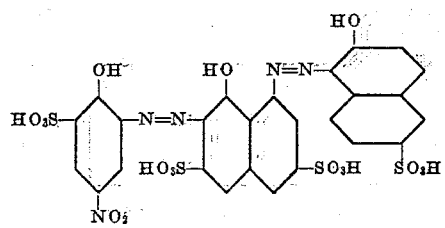

WALTER WEHRLI.
WILLY STEINEMANN.

REFERENCES CITED

The following references are of record in the file of this patent:

UNITED STATES PATENTS

| Number | Name | Date |
|---|---|---|
| 644,236 | Julius | Feb. 27, 1900 |